United States Patent [19]

Nakamura

[11] Patent Number: 4,615,403

[45] Date of Patent: Oct. 7, 1986

[54] WEIGHING DEVICE

[75] Inventor: Toru Nakamura, Kyoto, Japan

[73] Assignee: Kabuchiki Kaisha Ishida Koki Seisakusho, Kyoto, Japan

[21] Appl. No.: 702,141

[22] Filed: Feb. 15, 1985

[51] Int. Cl.⁴ .................... G01G 19/22; G01G 19/52; G01G 13/04

[52] U.S. Cl. ........................................ 177/25; 177/50; 177/121

[58] Field of Search ...................... 177/25, 50, 58, 121

[56] References Cited

U.S. PATENT DOCUMENTS 4,320,855 3/1982 Ricciardi et al. ................. 177/50 X
4,494,619 1/1985 Matsuno ................................ 177/25

*Primary Examiner*—George H. Miller, Jr.

*Attorney, Agent, or Firm*—Browdy and Neimark

[57] ABSTRACT

The present invention relates to a weighing device consisting of a feeder mounted on a framework placed below the discharging end of a conveyor loaded with the object to be weighed, such as peanuts, the feeder being equipped with a feed measurement device, and facing pool hoppers adjacent to the feeder or directly facing measure hoppers supported on load cells mounted on the framework. The present invention relates especially to a weighing device in which the feed measurement device consists of a weight measuring device such as a load cell, which is placed in between the feeder and the framework to support the feeder, and which controls the switching on and off of the drive, such as a motor, for the conveyor through a control unit including an amplifier and a low-pass filter.

5 Claims, 11 Drawing Figures

WEIGHING DEVICE

FIELD OF THE INVENTION

1. Field of the Invention

The disclosed technology belongs to the field of weighing the amount of the object supplied to the feeder of a computerised weighing device which measures off required amounts when packaging granular objects commonly handled on the market, such as peanuts.

2. Description of the Prior Art

As it is commonly known, granular or bulk objects, such as peanuts, are handled in large quantities on the commodity market. In order to display and sell such goods as merchandise, for example in supermarkets, the objects must be packaged in required unit weights into package trays or polyethylene bags in the backyard. Needless to say, shortage in weight must be avoided at all means, while overweight is undesirable in such cases, thus demanding a measurement of minimum positive overweight.

Since weighing manually cannot possibly meet all the requirements of weight measurement including packaging of diverse merchandise in large quantities quickly and accurately, weighing devices equipped with electrically vibrating troughs in the feeder are being developed, in which measure hoppers in the weighing section are supported on load cells which are in turn electrically connected to a computer to measure off the most desirable, minimum positive overweight. Various technologies relating to the details of such devices are also being developed.

On computerised weighing devices such as described above, the weighing in measure hoppers by load cells is made with their lids shut, thus approximately restricting entry of objects to be weighed, resulting in a so called intermittent weighing where the form of flow measurement is not taken. Hence, naturally, a form of intermittent feeding by conveyor is also adopted at the feeder. Therefore vibrational feeding has been adopted at the feeder for supplying the objects to the following weighing section.

The intermittent feeding from the conveyor to the feeder, and vibrational feeding from the feeder to the weighing section has posed various problems.

For example, in a commonly known multiple head computerised weighing device 1 with 10 to 15 heads, shown in FIG. 1, the object to be weighed such as peanuts, not shown, is dropped from the discharging end 6 of a bucket conveyor 5 placed above an electrically vibrating distribution table 4 of the feeder 3 located at the top part of framework 2, and is dispersed in radial direction under circumferential vibration of distribution table 4, to be discharged into electrically vibrating radial troughs 7,7 . . . placed adjacent to the perimeter of distribution table 4, and further into pool hoppers 8 suspended on the framework 2 and each corresponding to a radial trough 7. The object is then discharged into measure hoppers 10 supported on load cells 9 mounted on the framework 2, where its weight is detected by a strain gauge in the load cell 9 and supplied to a computer not shown. The computer performs necessary calculations to determine the combination of weights, and the trap doors on measure hoppers selected for the combination are opened to discharge their contents down the chute 11 below for transfer to the packaging stage by a conveyor.

In such a weighing device, the number of measure hoppers 10,10 . . . to take part in the weight combination among available measure hoppers 10,10 . . . is fixed (although the actual number of hoppers to participate may differ each time), and because the weight of the object to be discharged in each weight combination is decided as set weight and equal to the required value, the weight of the object to be dropped from the bucket conveyor 5 onto distribution table 4 is selected to match this value. That is, since the weight combination and discharging is performed intermittently at the weighing section, the dropping of the object from the bucket conveyor 5 onto distribution table 4 of feeder 3 is also made intermittently to match the discharge.

The feed rate of the object to be weighed dropped from bucket conveyor 5 onto the distribution table 4 of feeder 3 is controlled, according to prior art, by detecting the presence of the object with photoelectric sensors 13,13' which act to stop the drive of bucket conveyor 5 when the light beam is obstructed, and to restart the drive of bucket conveyor 5 to drop the object when the light is unobstructed, so that the feed rate matches the intermittent weight combination and discharging at the measurement section.

However, because the amount of object 12 to be measured which is piled on the distribution table 4 of feeder 3 is measured, according to prior art, by the height between the levels of distribution table 4 and photoelectric sensors 13,13' or, in terms of volume, as shown in FIG. 1, there exist the problem of the relationship between its height and weight not being linear due to fluctuation in slope face inclination caused by the vibration of distribution table 4. Also as the control becomes more sensitive, there arises the problem of fluttering of light beam at peak of piled object 12, while there also exists places where the volume cannot be measured at the boundary between the perimeter of distribution table 4 and adjoining radial troughs 7,7, . . .

Therefore, there exists instability at the delivery point from feeder 3, which including the distribution table 4 and pool hoppers 8, to measure hoppers 10, leading to cases where the most desirable combination may not be achieved with certainty in weight combination.

Such short comings are caused by the irrationality of the discharging of weight combinations at the weighing section being made strictly in terms of weight whereas at the feeder, intermittent feeding in terms of volume is being made, intermittent measurements of totally different dimensions being made at the entrance and exit of a unique flow.

Also, although there exists the potential of controlling the rate of vibrational feeding against pool hoppers 8,8 . . . , since the feeding against pool hoppers 8 and measure hoppers are intermittent as has been explained, this was not possible because the intermittent feeding and discharging were made in terms of totally different dimensions.

SUMMARY OF THE INVENTION

The objects of the present invention is to solve the problem of volumetric intermittent feeding at the feeder which does not match the weight combination and intermittent discharging by computerised weighing devices according to the aforementioned prior art, and to provide an improved weighing device useful in measurement related fields in the commodity industry, which measures the flow at both entrance and exit of a weighing device in terms of weight, to ensure a stable supply of the object to be weighed to the weighing section, and to enable reliable and accurate weight measurements.

DETAILED DESCRIPTION OF THE PREFERRED EMBODIMENT

Figure 1:
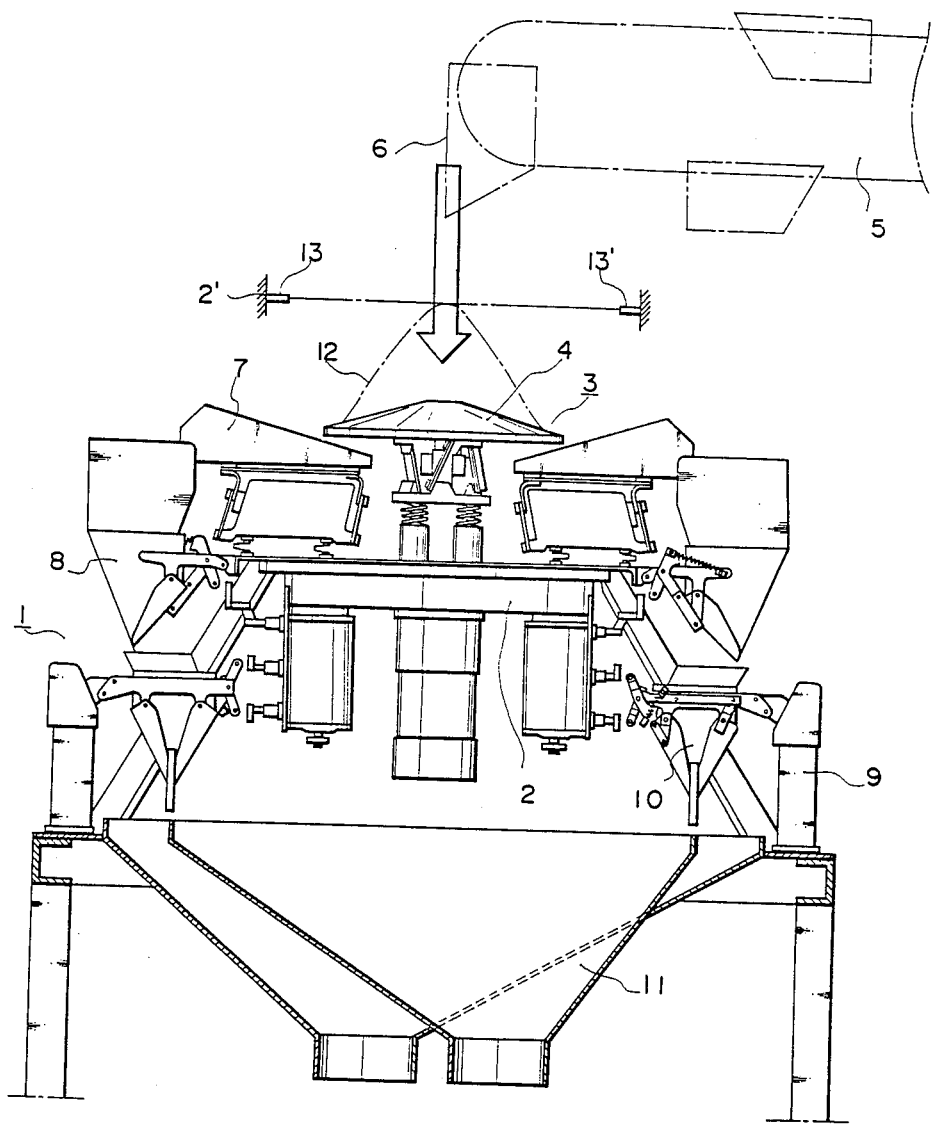
FIG. 1 is an explanatory diagram of feed measurement at the feeder of a weighing device of prior art.

In the embodiment shown in FIGS. 2 to 5, 1' indicates the computerised weighing device of the present invention, with a 10 to 15 head weighing section on the framework 2 in a circular layout below and concentric to the discharging end 6 of a bucket conveyor 5.

The feeder 3 located on the top part of framework 2 has a distribution table 4 immediately below the discharging end 6 of bucket conveyor 5, with radial troughs 7,7 . . . , each corresponding to said weighing heads, along its perimeter and mounted on the framework 2 through electromagnetic vibrators 14,14 . . . of commonly known type.

Below each radial trough 7 is connected a corresponding pool hopper 8 mounted on the framework 2, and below each pool hopper 8 is connected a corresponding weighing hopper 10 mounted on a commonly known load cell 9 which are fixed to the framework 2. Each weighing hopper 10 adjoins chute 11 on lower level to discharge their contents onto a conveyor 15 which transfers the object to the next, packaging process.

In practice, the weighing hoppers frequently are made to discharge directy into a packaging machine instead of being connected to conveyor 15.

Figure 3:
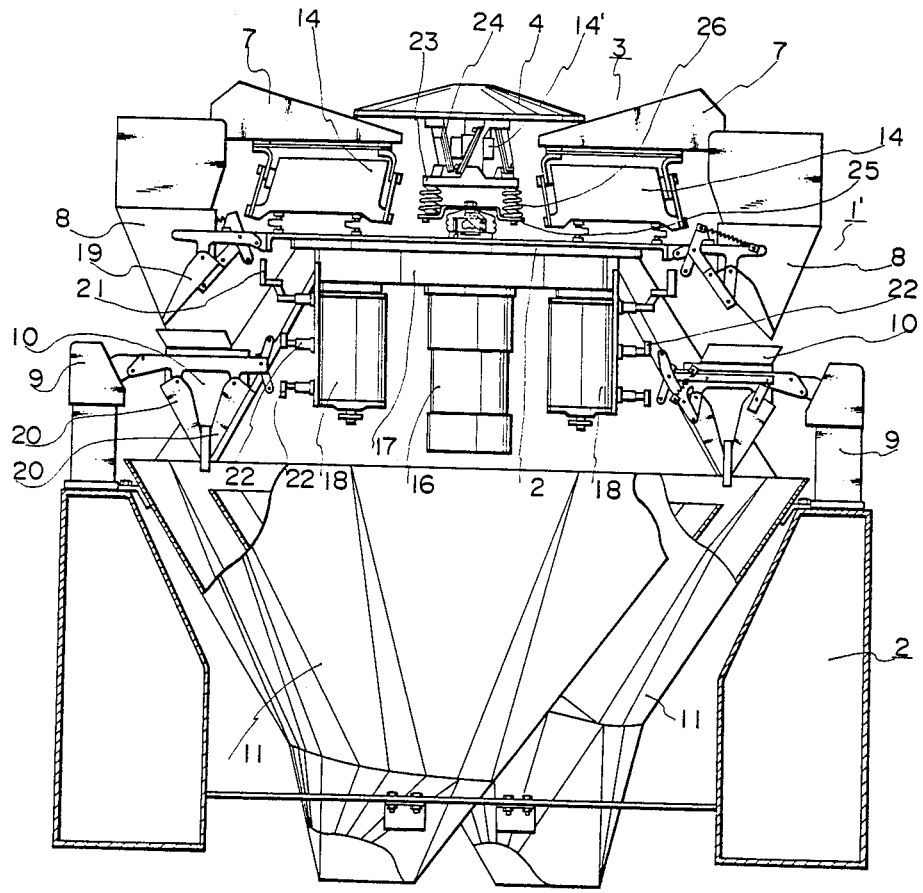
FIG. 3 is a side view of the mechanisms of the weighing device of FIG. 2.

In FIG. 3, 16 indicates a drive motor which operates the push rods 21,22,22 which in turn operate the trap doors 19 and 20 on pool hoppers 8 and weighing hoppers 10.

The distribution table 4, as indicated in FIG. 3, is mounted on a balance weight 23 through inclined leaf springs 24, and is equipped with a commonly known electromagnetic vibrator 14' which causes both vertical and circumferential oscillation, the balance weight 23 being mounted on a plate 25 located below through a number of cushion springs 26 distributed around the circumference.

Figure 4:
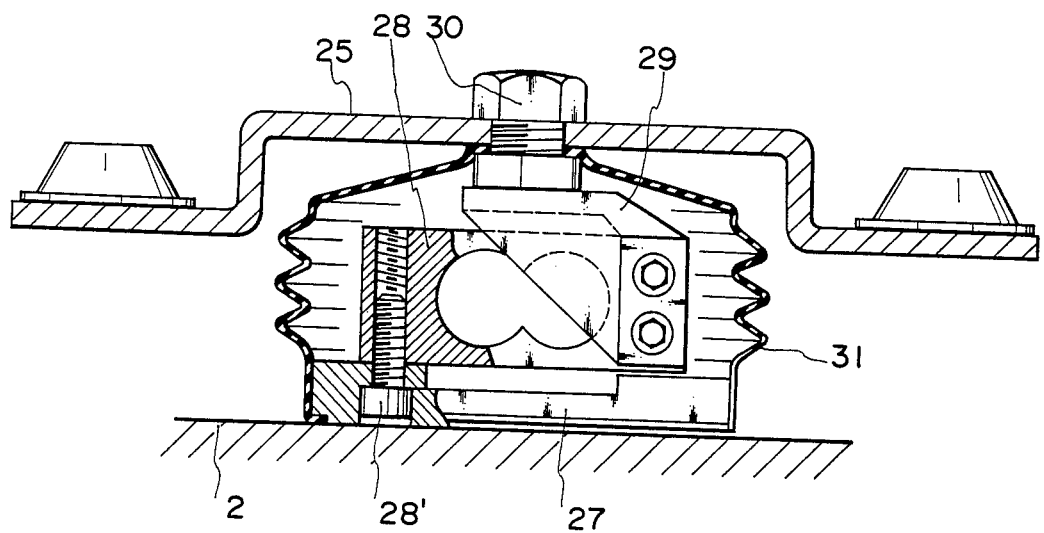
FIG. 4 is a partly enlarged view of the device shown in FIG. 3.

The plate 25, as indicated in FIG. 4 in detail, is fixed by bolt 30 to a bracket 29 fixed by means of bolts 28' to a load cell 28 which in turn is fixed also by bolts 28' to a disc shaped mounting plate 27 fixed to framework 2. A dust boot 31 is provided to enclose the space between the lower face of plate 25 and upper face of framework 2.

Thus the load cell 28 is subjected through plate 25 to vibrations both from the weight of the object being dropped on the distribution table 4 by bucket conveyor 5, and from the high frequency oscillation of the electromagnetic vibrator 14'.

Figure 2:
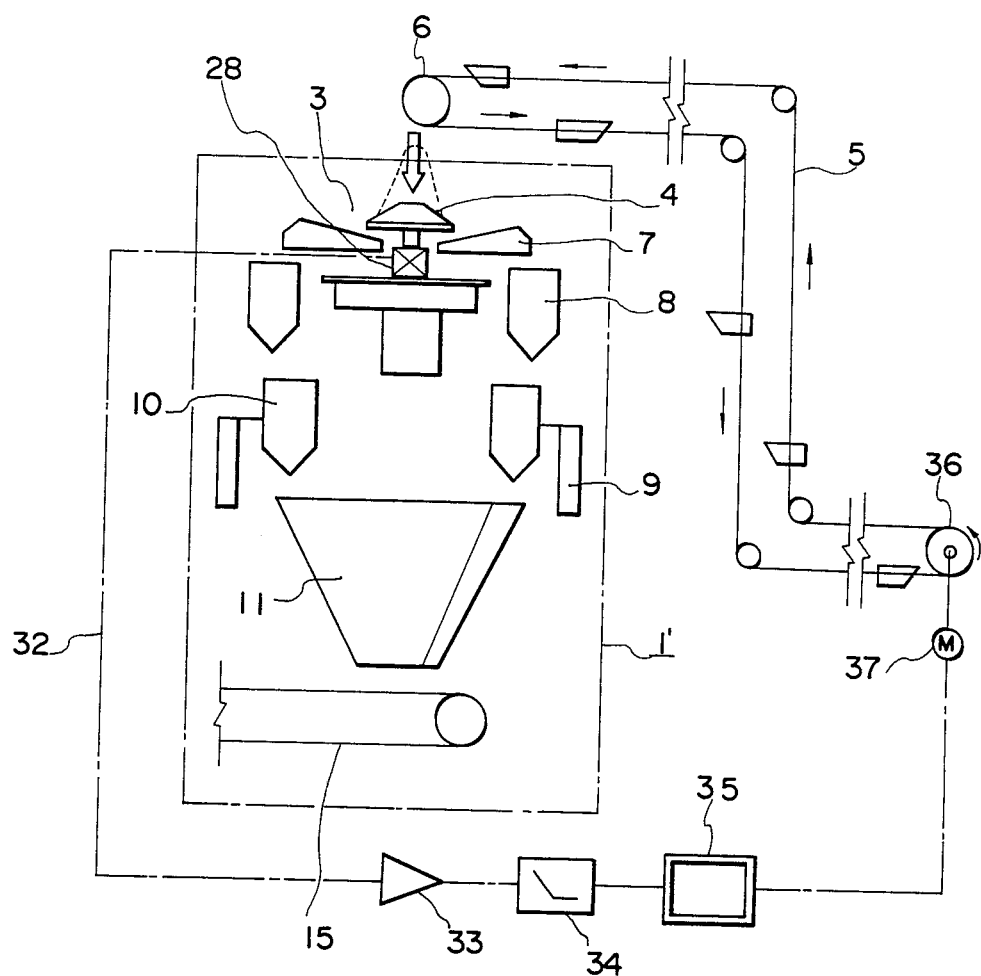
FIG. 2 is an overall flow diagram in outline of one of the embodiments.

For this reason, as shown in FIG. 2, the output from the load cell 28 is connected to an amplifier 33 via lead 32, then fed through a low-pass filter 34 before entering the control unit 35 to control the motor 37 of drive unit 36 for bucket conveyor 5.

<Preferred Embodiment of the Invention—Operation>

With a device constructed as described above, when an unindicated start button is pressed, the electromagnetic vibrators 14,14' and the drive motor 16 are started while the motor 37 of the drive unit 36 for the bucket conveyor 5 rotates to turn the bucket conveyor 5 and drop the object 12 such as peanuts from the discharging end of 6 of bucket conveyor 5 onto the distribution table 4 of the feeder 3 of the weighing device 1'.

The object 12 dropped onto the distribution table 4 is dispersed circumferentially by the vibration of electromagnetic vibrator 14' and is fed into radial troughs 7,7 . . . placed adjacent to the perimeter of distribution table. The object is then further discharged into pool hoppers 8 corresponding to each radial trough 7 from the end of radial troughs 7 under the action of electromagnetic vibrators 14 on each radial trough 7. The object is dropped into measure hoppers 10 on a lower level by opening trap doors 19 by operation of push rod 21 of operating mechanism 18, where its weight is measured by load cells 9,9 . . . supporting the measure hoppers. The measured weights are then read to a computer not shown, where necessary processing is performed to determine the combination of heads which provide the minimum positive overweight in relation to the required packaging weight of object 12. The trap doors 20 on measure hoppers 10 belonging to heads selected for the combination are then opened by push rods 22 of operating mechanism 18 under computer command through a control unit not shown, to discharge the contents down chutes 11,11 . . . to be transferred to the packaging stage which follows by a conveyor 15 located below. When the measure hoppers 10 of the determined combination release their contents, the trap doors 19 on pool hoppers 8 corresponding to these measure hoppers 10 are opened by push rods 21 of the operating mechanism 18 under computer command through a control unit not shown, feeding the contents of these pool hoppers 8 into the empty measure hoppers 10 while the open topped pool hoppers 8 are continuously fed with the object from radial troughs 7 under vibrational feeding by electromagnetic vibrators 14, to repeat the measuring process.

During this process, intermittent discharging by weight combination is made at the measurement section, this intermittent discharging being made in terms of weight. Intermittent feeding also takes place between pool hoppers 8 and measure hoppers 10.

Figure 11:
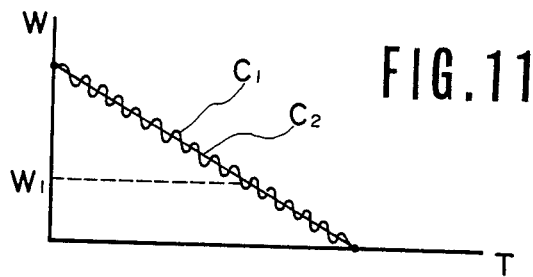
FIG. 11 is a graph showing the relationship between the feed weight signal and vibration signal at the feeder.

As the object is fed continuously by vibrational feeding from radial troughs 7 to pool hoppers 8 and also from distribution table 4 to radial troughs 7, the weight of the object fed onto distribution table 4 should, in principle, decrease linearly with time as shown by the line $C_1$ on the graph shown in FIG. 11, taking time Tm horizontal axis and weight W on vertical axis. However the load cell 28 is actually subjected to the sum of $C_1$ and the vibrational component $C_2$, which is fed into amplifier 33.

Component $C_2$ is removed by the low-pass filter 34 to isolate the trend component $C_1$ alone, which is fed into the control unit 35.

The conveyor starts with a weight $W_1 + \alpha$ ($\alpha = 2 \sim 3 \times W_1$) where $W_1$ corresponds to the known rate of intermittent discharging at the weighing section, making allowance for lag and spare, there being provided a difference larger than $W_1$ between the starting weight below which the motor 37 of drive unit 36 for the bucket conveyor 5 is restarted and the stopping weight above which it is stopped. By also providing a timer control or control by weight signal to prevent inching, controlling of the feed weight of the object to always match the intermittent discharging weight at weighing section can be ensured.

Therefore as a result, the discharging and feeding of the object from distribution table 4 to radial troughs 7 is made at a constant rate, and balance between the intermittent discharging at measurement section and the feeding at feeder can be ensured.

For this to be realised, it is necessary for the driven speed of the feed conveyor 5 and the feed rate of the conveyor (the amount carried by each bucket) to be adjusted to match the average rate of feed, every time the discharging weight is altered.

Thus a condition where the determination of required weight in determining the weight combination of measure hoppers 10 by load cell 9 in the weighing section, or the determination of combination of heads can be made with ease, is sufficiently realised.

As will be described later, the signal picked up by the load cell 28 may also be fed through a high-pass filter to detect the strength and frequency of the vibration caused by electromagnetic vibrators 14′, to detect the feed rate from distribution table 4 to radial troughs 7,7 . . . . In other words, the feed rate from each radial trough 7 to pool hopper 8 can be detected to control the flow in the feeder to match the intermittent discharging at the weighing section.

Figure 5:
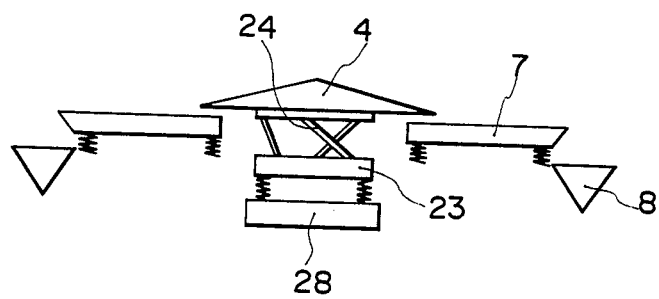
FIG. 5 is a schematic of parts of FIGS. 3 and 4.
Figure 6:
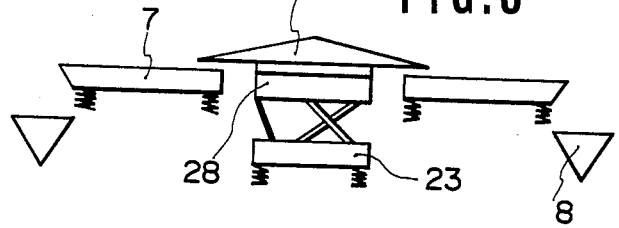
FIGS. 6 to 10 are schematics corresponding to FIG. 5, of other embodiments.

FIG. 5 illustrates the embodiment shown in FIGS. 3 and 4 in schematic form, while FIGS. 6 through 10 illustrates other embodiments of the invention. The embodiment shown in FIG. 6 is a variation to the embodiment shown in FIG. 5, in which the load cell 28 is located above the balance weight 23 and the distribution table 4 is mounted on the load cell 28, there being no substantial difference from the embodiment described before.

Figure 7:
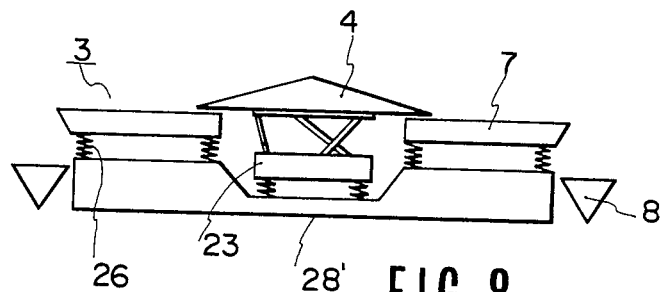

FIG. 7 shows an embodiment in which not only the distribution table 4 but the whole feeder including radial troughs 7,7 . . . is mounted upon the load cell 28′ through cushion springs 26. In this example, the object already transferred to the radial troughs 7 after over flowing from the perimeter of distribution table is included in the weight measurement at the feeder.

Figure 8:
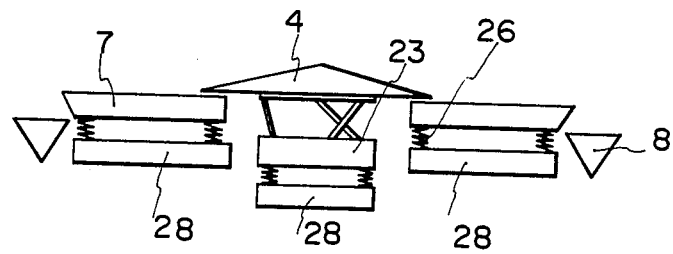

In the embodiment shown in FIG. 8, load cells 28 are provided not only on the distribution table 4, but also on each radial trough 7. In this example, not only is the weight of feed on distribution table measured, but also enables monitoring the set of pool hopper 8 and measure hopper 10 more frequently selected in the weight combination, so that the result can be fed back by raising the oscillating frequency of the electromagnetic vibrator 14 on corresponding radial trough 7, or by shifting the position of discharging end of conveyor 5.

Figure 9:
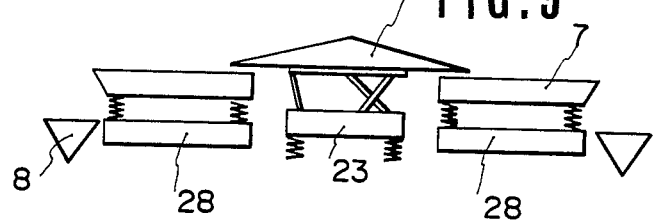

In the embodiment shown in FIG. 9, no load cell is provided on the distribution table 4, but only on the radial troughs 7 around it. In this example, the weight of the object being transferred to each pool hopper 8 in feeder 3 is measured en route, to control the stopping and starting of motor 37 of drive unit 36 for conveyor 5 so as to match the flow rate of the object on the way to the weight of intermittent discharging at the weighing section, and also to control the electromagnetic vibrators 14 on radial troughs 7 in order to control the rate of feed.

Figure 10:
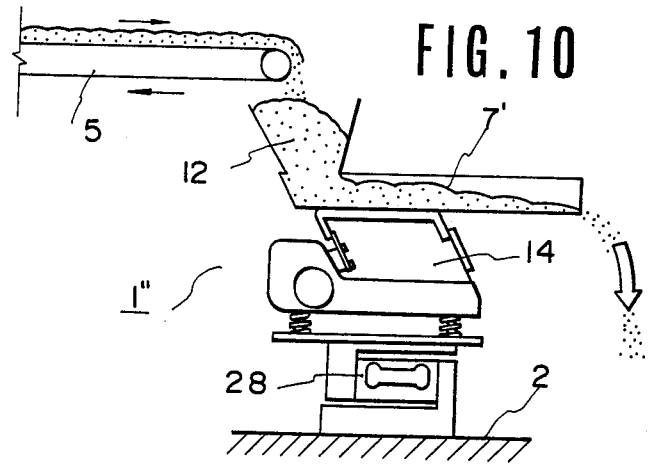

Whereas the aforementioned embodiments relate to weighing devices with multiple heads in circular layout, the embodiment shown in FIG. 10 relates to a single head unit. In a weighing device 1″ in which a conveyor 5 faces a hopper for feeding a trough 7′ which connects to a packaging conveyor belonging to the next stage, a load cell 28 is provided on the feeding trough 7′ itself, to control the supply of the object to the feeding trough 7′. As with the aforementioned embodiments, the weight of the object supplied to the feeding trough 7′ is determined by extracting the trend component from the output signal of load cell 28 using a low-pass filter, to control the drive unit for conveyor 5.

Needless to say, the realisation of this invention is not restricted to those embodiments described above. For example, as mentioned before, instead of controlling the conveyor drive unit by removing the high frequency component caused by the electromagnetic vibrator in feeder from the feed weight of the object detected by the load cell, the trend component of the feed weight may be removed, extracting the vibrational component caused by the electromagnetic vibrator and controlling this component, to control the feed during transfer to match the intermittent discharge at the weighting section.

According to the present invention, by providing a weight measuring unit in the feeder of a computerised weighing device, the starting and stopping of the conveyor to feeder can be controlled by accurately measuring the feed weight, to match the intermittent discharging at the weighing section by preset unit weights.

Since, the feed weight can be measured accurately at the feeder, the instability in linearity between the weight and height detections is avoided, thus enabling measurement of feed weight compatible to the intermittent discharging, and controlling of conveyor.

Hence, as the flow of the object to be weighed at the feeder or at transfer points in accordance with intermittent discharging at the weighing section becomes more stable in weight, the weighing and weight combination in accordance to the intermittent discharging at weighing section can be made precisely as designed.

Depending on design, because the weight measuring device in the feeder can control not only the driving of conveyor to feeder by using a low-pass filter, but also the vibrational feeding by extracting the vibration using a high-pass filter, the flow of mass through the feeder or at transfer points matching the intermittent discharge at the measurement section can be made to agree with one another and to be stable, as a consequence.

What is claimed is:

1. A combinatorial weighing device comprising:
   a feeder located below a discharging end of a conveyor;
   the feeder connected to pool hoppers;
   the pool hoppers facing measure hoppers supported on load cells mounted on the framework of the device;

a feed measurement device for the objects to be weighed and electric vibrator are provided at the feeder;

the feed measurement device being a weight measurement device of a load cell connected to a control unit via a low-pass filter inserted between the feeder and the framework of the device;

the feed measurement device electrically connected to the drive unit for the conveyor through a control unit.

2. A weighing device according to claim 1, in which said weight measurement device is provided for the whole feeder.

3. A weighing device according to claim 1, in which said weight measurement device is provided at least on a distribution table.

4. A weighing device according to claim 1, in which said weight measurement device and an electric vibrator are provided on the distribution table.

5. A weighing device according to claim 1, in which said weight measurement device is provided on the radial troughs.

* * * * *

UNITED STATES PATENT AND TRADEMARK OFFICE
CERTIFICATE OF CORRECTION

PATENT NO. : 4,615,403
DATED : October 7, 1986
INVENTOR(S) : Nakamura

It is certified that error appears in the above-identified patent and that said Letters Patent is hereby corrected as shown below:

Add the following to the first page of the patent:

-- [30] Foreign Application Priority Data

Feb. 16, 1984 [JP] Japan.....59-019795--

Signed and Sealed this

Twentieth Day of January, 1987

*Attest:*

DONALD J. QUIGG

*Attesting Officer*  *Commissioner of Patents and Trademarks*